United States Patent
Chien (10) Patent No.: US 7,651,365 B2
(45) Date of Patent: Jan. 26, 2010

(54) OUTLET ADAPTER WITH EL ELEMENTS, RECEPTACLES FOR OTHER ELECTRIC DEVICES, AND PRONGS FOR SUPPLYING POWER FROM A POWER SOURCE TO THE RECEPTACLES AND EL ELEMENTS

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 0 days.

(21) Appl. No.: 11/152,063

(22) Filed: Jun. 15, 2005

(65) Prior Publication Data

US 2005/0233633 A1 Oct. 20, 2005

Related U.S. Application Data (63) Continuation-in-part of application No. 10/954,189, filed on Oct. 1, 2004, now abandoned, and a continuation-in-part of application No. 11/094,156, filed on Mar. 31, 2005, now Pat. No. 7,318,653, and a continuation-in-part of application No. 11/094,155, filed on Mar. 31, 2005.

(51) Int. Cl.
*H01R 3/00* (2006.01)
(52) U.S. Cl. ..................................................... 439/490
(58) Field of Classification Search ................. 439/488, 439/489, 490, 491, 86, 484; 362/84, 95, 362/641
See application file for complete search history.

(56) References Cited

U.S. PATENT DOCUMENTS

| | | | | | |
|---|---|---|---|---|---|
| 3,056,897 | A | * | 10/1962 | Knochel et al. | 313/483 |
| 3,061,716 | A | * | 10/1962 | Benander | 362/641 |
| 3,307,030 | A | * | 2/1967 | De Francisco | 362/659 |
| 4,927,376 | A | * | 5/1990 | Dickie | 439/484 |
| 5,601,358 | A | * | 2/1997 | Chien | 362/190 |
| 5,662,408 | A | * | 9/1997 | Marischen | 362/641 |
| 5,683,166 | A | * | 11/1997 | Lutzker | 362/84 |
| 5,926,440 | A | * | 7/1999 | Chien | 368/10 |
| 6,010,228 | A | * | 1/2000 | Blackman et al. | 362/95 |
| 6,170,958 | B1 | * | 1/2001 | Chien | 362/84 |
| 6,171,117 | B1 | * | 1/2001 | Chien | 439/86 |
| 6,183,101 | B1 | * | 2/2001 | Chien | 362/84 |
| 6,190,017 | B1 | * | 2/2001 | Lai | 362/95 |
| 6,280,053 | B1 | * | 8/2001 | Chien | 362/228 |
| 6,527,400 | B2 | * | 3/2003 | Dickie et al. | 362/84 |
| 2002/0163796 | A1 | * | 11/2002 | Dickie et al. | 362/84 |
| 2003/0092297 | A1 | * | 5/2003 | Reindle et al. | 439/107 |

* cited by examiner

Primary Examiner—Chandrika Prasad
(74) Attorney, Agent, or Firm—Bacon & Thomas, PLLC (57) ABSTRACT

An outlet adaptor with EL elements has at least one set of prongs to connect with an existing outlet device and at least one set of receptacle members connected to the prongs by a metal structure(s) that enables other electric devices to get electric signals from the outlet adaptor. EL elements are arranged on the outlet adaptor body at any location and connected with the outlet adaptor's metal structure(s) to provide the EL elements with power for any of a variety of illumination effects.

18 Claims, 6 Drawing Sheets

OUTLET ADAPTER WITH EL ELEMENTS, RECEPTACLES FOR OTHER ELECTRIC DEVICES, AND PRONGS FOR SUPPLYING POWER FROM A POWER SOURCE TO THE RECEPTACLES AND EL ELEMENTS

This application is a continuation-in-part of U.S. patent application Ser. No. 10/954,189, filed Oct. 1, 2004 and now abandoned; U.S. patent application Ser. No. 11/094,156, filed Mar. 31, 2005, now U.S. Pat. No. 7,318,653, and U.S. patent application Ser. No. 11/094,155, filed Mar. 31, 2005. It is also related to copending U.S. patent application Ser. Nos. 10/667,787; 10/286,871; and 10/621,513.

BACKGROUND

The inventor's prior art U.S. Pat. No. 5,926,440, U.S. Pat. No. 6,158,868, U.S. Pat. No. 6,170,958, U.S. Pat. No. 6,171,117, and U.S. Pat. No. 6,280,053 disclose arrangements of conductive means for a night light and multiple function night light incorporated with a time piece. U.S. Pat. Nos. 4,947,291, 5,495,402, 5,662,408, 5,713,655, 5,803,579, 5,816,682, 5,833,350, 5,893,626, 5,998,928, 6,000,807, 6,010,228, 6,031,958, 6,033,087, 6,056,420, 6,132,072, 6,160,948, 6,161,910, 6,183,101, 6,190,017, 6,290,368, 6,337,946, 6,386,730, 6,390,647, 6,00,104, 6,411,524, 6,431,719, 6,509,832, 6,523,975, 6,550,949, 6,609,812, 6,623,416, 6,641,289, 6,648,496, 6,709,126 all show different light sources and applications, although none teaches Electro-Luminescent (hereinafter EL) elements incorporated with an outlet adaptor means. The prior outlet adaptor means includes prong means having a desired configuration to insert into the outlet's receptacle(s) to get electric delivery from the outlet to the another device. The outlet adaptor means have at least one set of the prong means including polarized wide and narrow prongs to permit insertion into an outlet's receptacle. The adapter means can also have a ground prong to meet market requirements. The outlet adaptor means at least have one set of receptacle means to allow the other device's prong means to be connected to the receptacle means. The number of the receptacle means may be from 1 to N (any number) and the receptacle means may have any desired orientation or location on surface of the outlet adaptor's body. The receptacle means may be side by side, on opposite sides, on adjacent sides, on an end side, or on other surface(s). The outlet adaptor means has at least one function that may be selected from the group consisting of:

(F1) increasing a number of outlet receptacle(s) to allow connection with as many other electric devices as possible.

(F2) changing the orientation, position, angle, or location of the receptacles relative to the original outlet receptacles so that one can connect the other electric devices at a desired location, orientation, position, clearance, or space arrangement.

(F3) accommodating the different specification of other electric devices' prong means in the existing available outlet receptacle, for example by changing from the two receptacles of the existing outlet (which do not have a ground) to the three receptacles (including ground receptacle) of the outlet adaptor means.

(F4) providing improved space utilization, for example by enabling utilization of the limited space available in an extension cord with very close receptacles to connect a relatively large transformer, by changing the angle, dimension, location, height, position etc. at which the transformer may be connected.

(F5) providing features including surge protection, switch protection, power failure protection, constant power supply protection, high voltage protection, and/or overload protection.

(F6) providing functions of a sensor device, motion sensor, light sensor, remote controller, PIR device, transmit and receiving device, infrared device, blue tooth device, remote charging device, remote current delivery device, lighting device, voltage detector device, current detector device, or other conventional other device to enable supply of electricity from the outlet to other electric devices.

The electro-luminescent means may include an (EL1) EL panel, (EL2) EL wires, (EL3) EL twisted tube, and (EL4) organic EL (hereinafter OEL) or (EL5) organic LED (hereinafter OLED) on a desired (S1) configuration, (S2) size, (S3) dimension, (S4) specification, (S5) shape, (S6) curvature, or (S7) diameter that may be arranged on the outlet adaptor's body on a (L1) surface, (L2) layers, (L3) underneath, (L4) within the layers, (L5) injected inside, (L6) opening, (L7) cutouts, or (L8) windows to allow people to see the light beams, as is known from several of the inventor's issued patents or pending applications. The invention may utilize any suitable skills and procedures set forth in the other issued patents or pending applications without departing from the scope of the invention.

The outlet adaptor means with EL element(s) of the invention provides an outlet adaptor with proper illumination that can be seen by viewers to offer a safe lighting device with low cost for all existing outlet adaptor means.

DRAWING

FIG. 2-1 shows a second preferred embodiment of outlet adaptor with EL element having a special metal means to enable electric delivery from one end to a plurality of the ends, i.e., from a one prong input for electric signals to three other receptacles which are at desired orientations.

FIG. 3-1 shows a third preferred embodiment of an outlet adaptor with EL elements having a special metal means to allow the electric delivery from one end with two prong members to three receptacles, so as to allow the other electric device's three prong members to be connected with outlet adaptors having two prong members.

FIG. 4-1 shows the fourth embodiment with overload protector and re-set features.

FIG. 5-1 shows the fifth embodiment with switch means to control electric delivery from the prong members to the receptacle members.

DETAILED DESCRIPTION OF THE PREFERRED EMBODIMENTS

Figure 1:
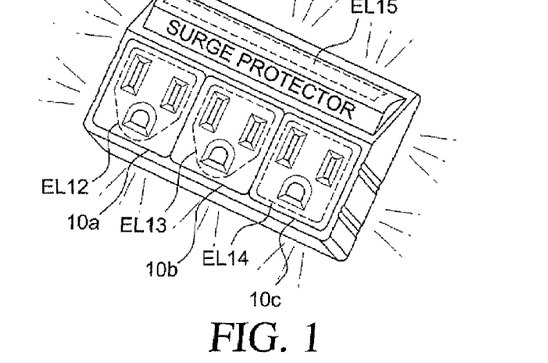
FIG. 1 shows a first preferred embodiment of an outlet adaptor means with EL elements.

FIG. 1 shows an outlet adaptor (10) with surge protector function and EL elements (EL12) (EL13) (EL14) (EL15) at desired locations and having a size, shape, color, and brightness that enables light beams to reach a viewer. The EL elements can be arranged on the surface, underlay of the frame, underlay of the pc film according to UL standard, underlay of a clear plastic lens, under an opening, under an window, or under cutouts to provide a proper design that has a good cosmetic appearance according to, for example, the Inventor's own prior patents.

Figure 2:
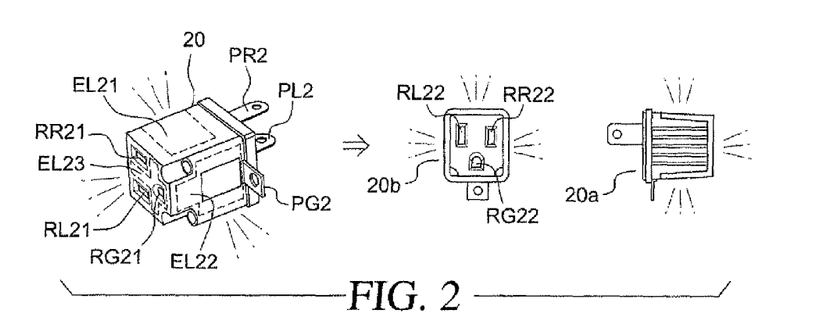
FIG. 2 shows the preferred embodiment at different viewing angles.
Figure 21:
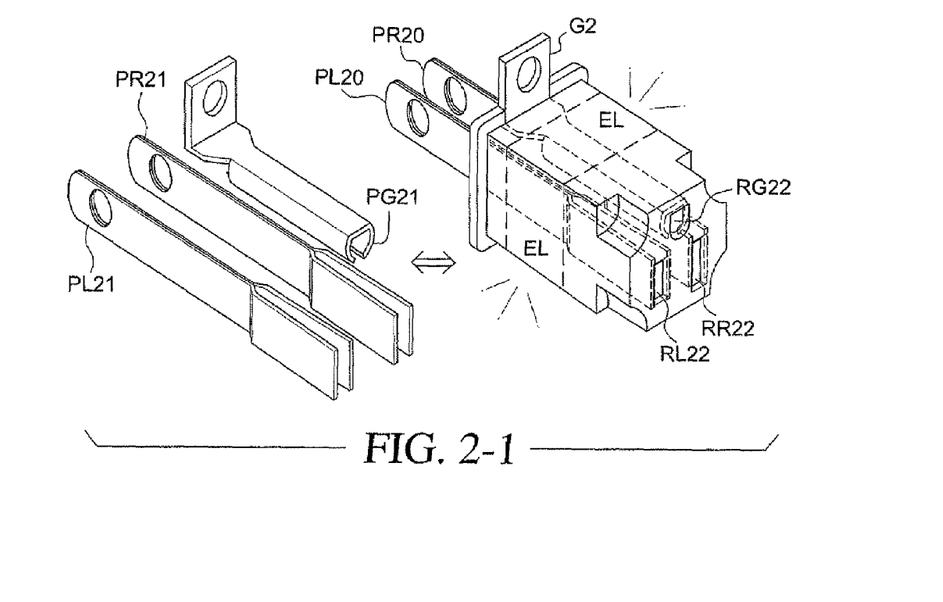

FIG. 2 shows a simple outlet adaptor (20) having prong means with prong members (PR2) (PL2) for insertion into the existing outlet to deliver electric signals from the prong means to receptacle means (RR21) (RL21) (RG21). This type of outlet adaptor enables a three prong member device to be connected with the two receptacle members of the existing outlet device. This is a widespread requirement in the marketplace because some countries require electric devices to already have the prong members, including a wider prong, narrow prong, and ground prong for a new safety standard. However, some old buildings and some countries still use the two receptacles means so that outlet adaptors are needed to help make the electric connection from two receptacles to three prong means. The EL elements (EL21) (EL22) can be located on any conceivable location with desired size, shape, color, brightness as long as the elements electrodes are well connected with the prong means' metal to cause the electric signals to illuminate the elements under predetermined conditions, timing, and functions. The outlet adaptor (20) has a different appearance in the front view (20*b*) and side view (20*c*). As shown in FIG. 2-1, the metal means (PR21) (PL21) (PG21) of the outlet adaptor allow the outlet adaptor to connect the two prong members with an existing outlet and offer the three receptacle members (RG22) (RR22) (RL22) for another electric device's prong means arrangement. Each metal means has a prong member and receptacle member on the same unit so as to provide the best electric delivery result.

Figure 3:
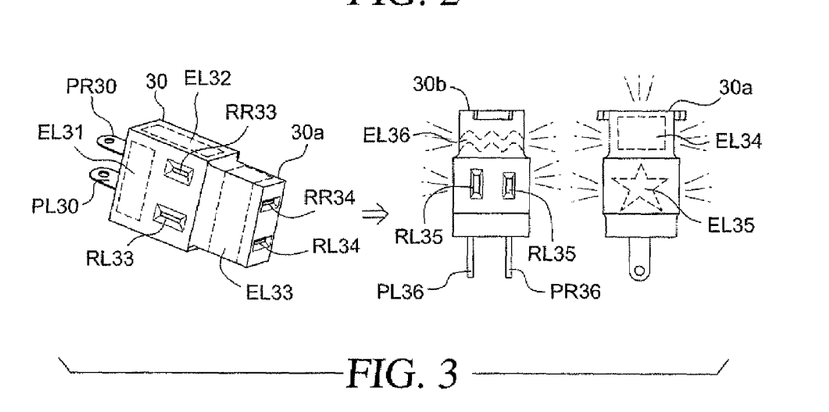
FIG. 3 shows a third preferred embodiment of an outlet adaptor with EL elements for different viewing angles.
Figure 31:
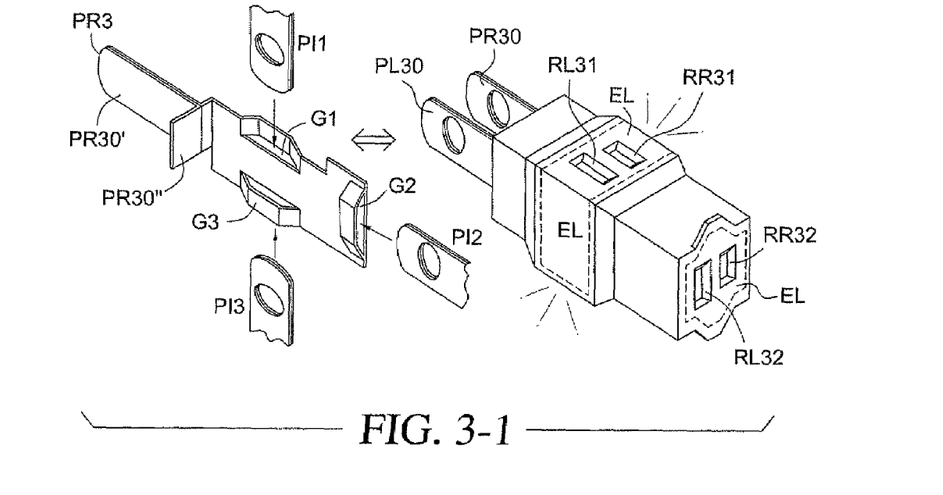

FIG. 3 discloses an outlet adaptor with one set of prong means with two prong members (PR30) (PL30) but with three sets of the receptacles means each having two receptacles members including members (RR33) (RL33) and (RR38) (RL38) and (RR34) (RL34). The three sets of the receptacles means are located on opposite surfaces (RR33) (RL33) & (RR38) (RL38) and end surfaces (RR34) (RL34). This application not only offers a plurality of receptacle means from the single set of the prong means but also offers a variety of locations of the receptacle means on the three sides of the outlet adaptors surface. This outlet adaptor enables people to connect the power source from a variety of choices having different orientations to connect with the existing outlet device. The outlet adaptor (30) has different appearance in the front view (30*b*) and side view (30*a*). The EL elements (EL31) (EL32) (EL33) (EL34) (EL35) (EL36) have a design, size, shape, brightness, color to enable installation on the outlet adaptor's body to emit light beams to a viewer. As shown in FIG. 3-1, the metal means (PR3) have a special design to integrate the prong member (PR30') on front with the three receptacle members (G1) (G2) (G3) on the side and rear, allowing prong members of other devices (P11) (P12) (P13) to be inserted into the receptacle member to deliver electricity from prong means (PR3) to the other device prong means (P11) (P12) (P13).

Figure 4:
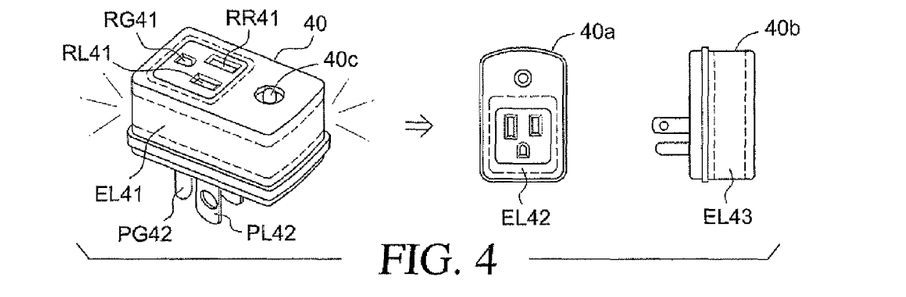
FIG. 4 shows a fourth preferred embodiment of an outlet adaptor with EL elements for different viewing angles.
Figure 41:
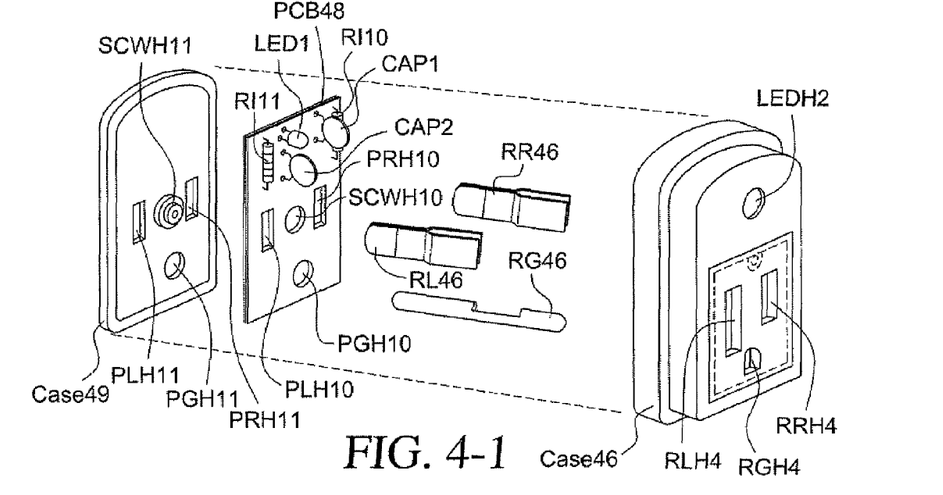

FIG. 4 show an outlet adaptor with an overload protector and re-set function. This is a multiple function outlet adaptor as discussed above in connection with functions F1 to F6. As shown in FIG. 4-1, the outlet adaptor has a circuit means (PCB48) with a variety of electric components such as (RI10) (CAP1) (Cap2) RI11) and second light means (LED1) and the slots (PRH10) (PLH10) (PGH10) for prong member installation. The outlet adaptor can detect overload current and voltage and cut the power off when an overload has been detected, and can re-set the system according to a built-in circuit means. The outlet adaptor may have desired functions incorporated into the related circuit means and control means so as to provide any function in the above discussed function list from F1 to F6. The circuit means with the control means on the circuit board (PCB48) are securely mounted on the base (case 49) and top case (case 46) by screws. The prong member (PR46) and (PL46) and (PG46) are soldered on the circuit board (PCB48) though the holes (PRH10) (PLH10) (PGH10) passing though the case hole (PRH11) (PLH11) (PGH11) to extend out from the back case (case 99) and connect with the outlet power source. The second light means (LED1) can also be another light means such as a neon bulb, fluorescent tube, gas filled bulb, neon tube, OEL, or OLED for indicator, lighting, and illumination purposes to obtain different light intensities and accents to a viewer. As shown in FIG. 4, the variety of EL elements (EL41) (EL42) (EL43) can be arranged on any location on the outlet adaptor body. The second light means (40C) is an indicator light in this embodiment. The receptacle means includes the three receptacle members (RR41) (RL41) (RG41) on a front surface of the outlet adaptor (40). The front view (40*a*) differs from the side view (40*b*).

Figure 5:
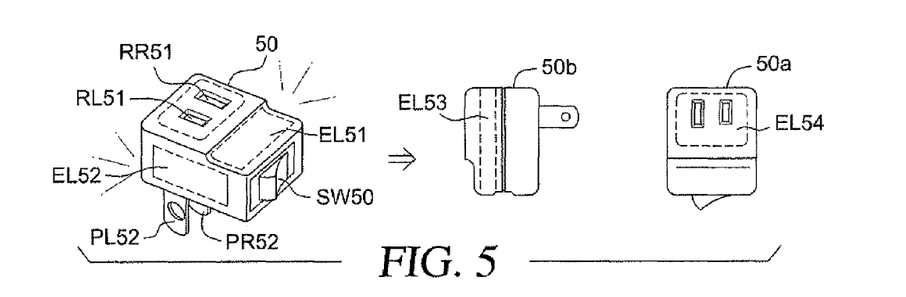
FIG. 5 shows a fifth preferred embodiment of an outlet adaptor with EL elements for different viewing angles.
Figure 6:
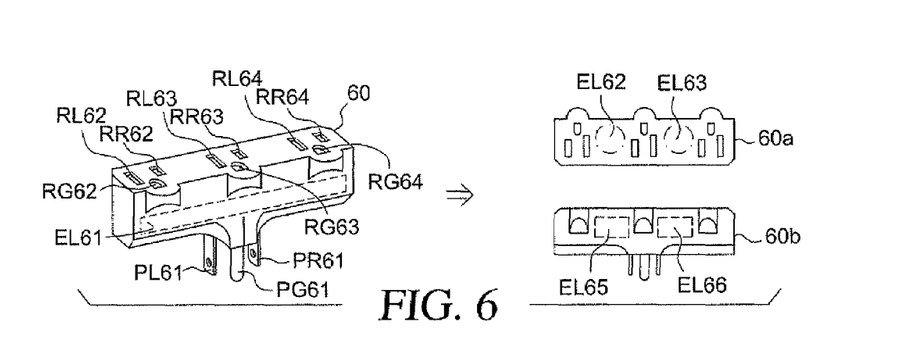
FIG. 6 shows a sixth preferred embodiment of an outlet adaptor with EL elements for different viewing angles.
Figure 7:
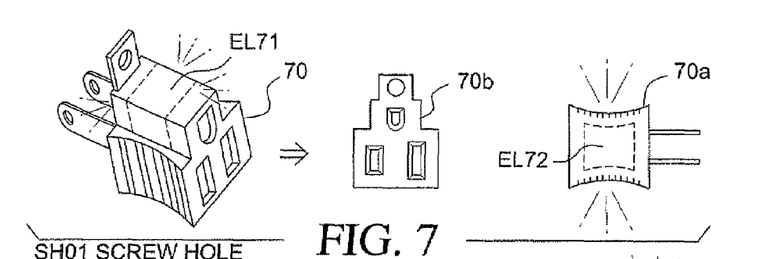
FIG. 7 shows a seventh preferred embodiment of an outlet adaptor with EL elements for different viewing angles.
Figure 51:
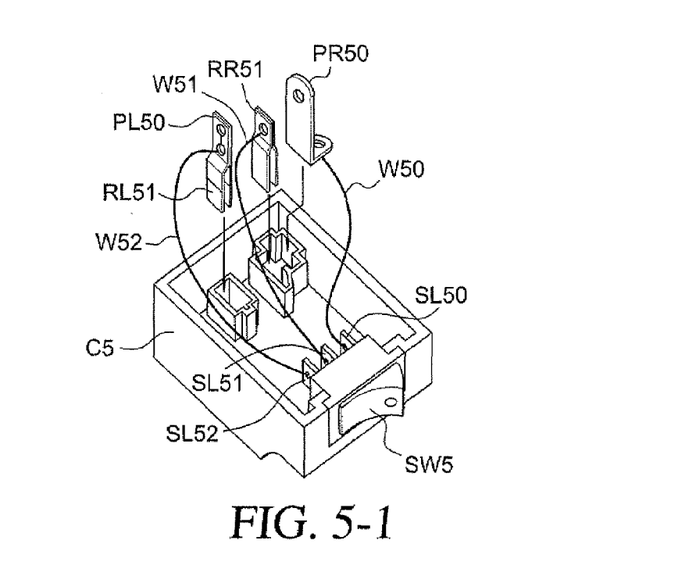

FIG. 5 shows an outlet adaptor (50) with a prong means having two prong members (PR52) (PL52) and receptacle means having two receptacle members (RR51) (RL51) with EL elements (EL51) (EL52) (EL53) (EL54) at desired locations with desired brightness, color, shape, size, and dimensions for illumination. The extra switch means causes the control function for the on and off supply of electric signals from the prong means to the receptacle means. FIG. 5-1, shows the details of construction of the control device of the switch means and its wiring. The switch has three terminals to connect with the prong member (PR50) and its wires (W50) and pass though the terminals (SL50) to supply the electric signals though terminal (SL51) and wire (W51) to the receptacle member (RR51). The other prong member (PL50) and receptacle member (RL51) are connected with the wire (W52) on the terminal (SL52) as a common electrode. This is an example of a control device for the outlet adaptor (40). The outlet adaptor (40) also can have other control means such as a sensor device, motion sensor, light sensor, PIR sensor, infrared sensor, electric signals transmitting and receiving device, Bluetooth device, remote control device, remote charging device tec. as discussed above.

Figure 8:
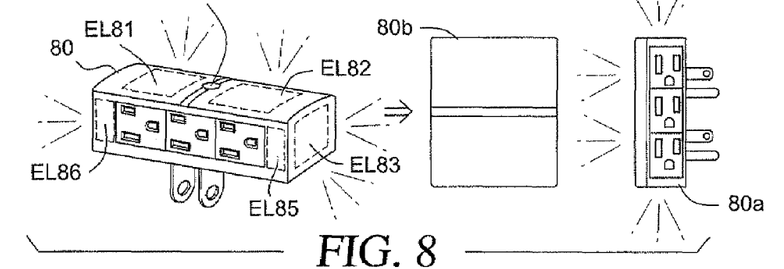
FIG. 8 shows an eighth preferred embodiment of an outlet adaptor with EL elements for different viewing angles.
Figure 9:
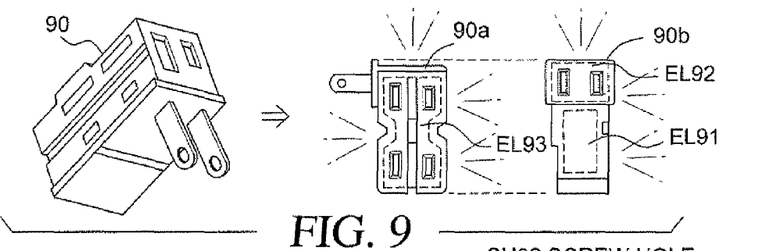
FIG. 9 shows a ninth preferred embodiment of an outlet adaptor with EL elements for different viewing angles.
Figure 10:
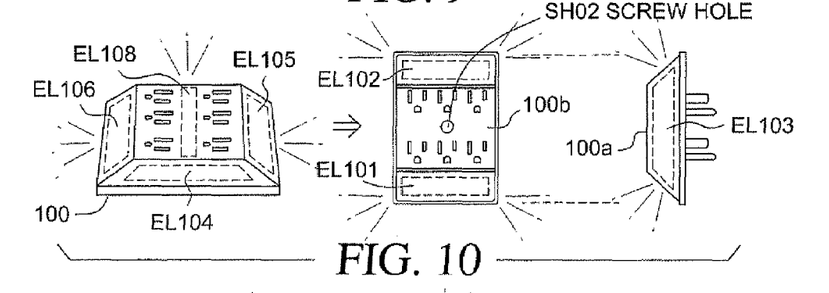
FIG. 10 shows a tenth preferred embodiment of an outlet adaptor with EL elements for different viewing angles.
Figure 11:
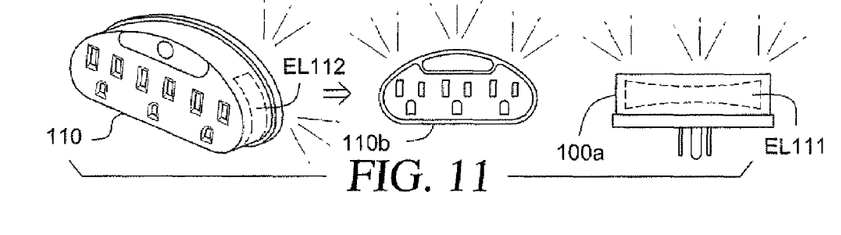
FIG. 11 shows an eleventh embodiment of an outlet adaptor with EL elements for different viewing angles.

FIGS. 6, 7, 8, 9, 10, 11 disclose different embodiments with the EL elements on any desired location with a different size, shape, dimension, color, brightness, art work, stencil, indicia, illumination appearance under predetermined conditions, timing, function, and/or duration. The outlet adaptors (60) (70) (80) (90) (100) (110) have prong means and related prong members to connect with the existing outlet power source, extension cord outlet power source, or other device outlet power source. The electric signals will be delivered from the inner metal means to the receptacle means having preferred receptacle members with wide and narrow members and, optionally, a ground member from 1 set to N-number sets at a desired location, orientation, spacing, and angle of the outlet adaptor surface to allow the other electric device's prong means to be connected with a receptacle means to receive power or electric signals under predetermined conditions, timing, duration, function, and features. The EL elements and the optional second light means provide one or more desired function to the viewer such as lighting, indicator message, illumination or other functions. FIG. 8 and FIG. 10 show a central screw hole (SHO1) and (SHO2) to allow the screw to pass though and fasten the outlet adaptor on the existing outlet device solid so as to prevent the adaptor from being knocked out of position by a strong impact.

Figure 12A:
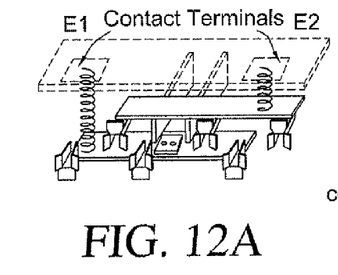
FIG. 12 shows preferred EL elements with different EL electrode designs and electric conductive means combinations to provide electric delivery from the metal members to the EL elements.
Figure 12B:
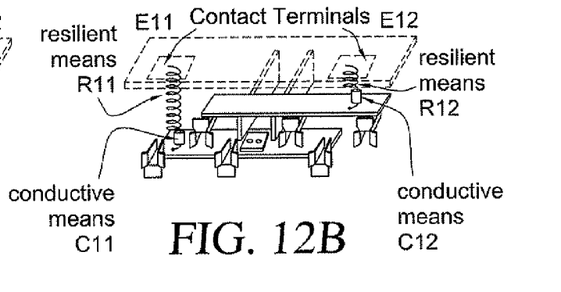
Figure 12C:
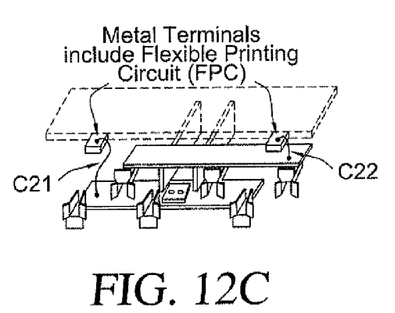
Figure 12D:
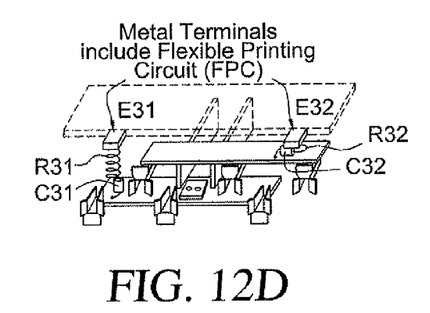
Figure 12E:
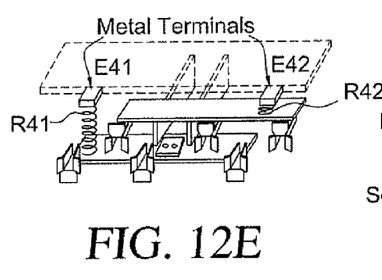
Figure 12F:
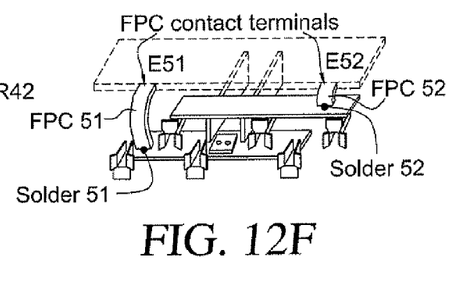

FIG. 12A shows a variety of methods, skills, and processes for making the electric connection from the outlet adaptor metal means to the EL elements. As shown in FIG. 12A, the EL element has contact terminals (E1) (E2) with resilient conductive means such as a metal spring, conductive rubber, or the like to carry electric signals or current from the metal means to the EL elements, as is known from the Inventor's prior patents. As shown on FIG. 12B, the resilient conductive means are further incorporated with other conductive means such as a metal piece, conductive wire, soldering paste, soldering tool, and fixing means for the same purpose as the conductive means of FIG. 12A, i.e., for supplying electricity from the metal means to the EL element means. As shown in FIG. 12C, the EL element has its electrodes in the form of the metal terminals such as clamp type, strip type, or flexible printed circuit board (hereafter as FPC) terminals which can be directly soldered to the conductive means of FIG. 12C or connected with resilient spring and conductive wires by the soldering process of FIG. 12D, or that can simply use the resilient conductive spring of FIG. 12E. The electrodes can also be directly soldered to a flexible printed circuit (FPC) with the metal means shown in FIG. 12F. These preferred embodiments of FIGS. 12A, 12B, 12C, 12D, 12E, 12F show the variety of ways that the EL may be connected to the outlet adaptor's metal means. It will be appreciated that these and other alternative methods or processes still fall within the scope and spirit of the current invention. The EL element terminals and electrode arrangements are available from the conventional market, including contact area type, terminal type, metal terminal type, FPC type, glue terminal type, clamp type, and punch type terminals. The current invention uses the EL element to connect with outlet adaptor metal means to deliver the electric signals from the metal means to the EL elements means by contact, soldering, press, riveting, or snapping process, and may also incorporate related conductive means and materials, which all fall within the current invention's scope and spirit to provide an outlet adaptor with EL element applications.

Those skilled in the art will appreciate that the preferred embodiments described above to illustrate the invention are not intended to be limiting, and that any alternative or equivalent designs will still fall within the scope of the invention.

What is claimed is:

1. An outlet adaptor with electro-luminescent (EL) elements, comprising:
    an outlet adaptor unit having at least one set of the prong means including fixed, non-swiveling prong members arranged to be connected to a power source;
    at least one EL element arranged to be connected to the prong means by conductive means, resilient conductive means, or soldering;
    at least one set of receptacle means including receptacle members arranged to be connected to the prong means and to receive prongs of at least one other electric device to supply power from the power source to the other electric device,
    wherein said outlet adaptor has at least one of the following characteristics:
        (F1) a number of outlet receptacles is greater than two to allow connection with a plurality of other electric devices; and
        (F2) the receptacle members have different orientations from the prong members to enable connection to the other electric device irrespective of the location, orientation, position, clearance, and space occupied by the other electric device,
        (F3) accommodate different specifications of the prongs of the other electric device;
        (F4) enable connection to multiple electric devices in a limited space,
    wherein the outlet adaptor further includes at least one of a surge protector, switch protector, power failure protector, constant power supply protector, high voltage protector, or overload protector, and
    wherein an opening, window, or cut-out for the EL element and an opening for the receptacle means are in a same surface or in adjacent surfaces.

2. The outlet adapter with EL elements as claimed in claim 1, wherein the at least one EL element is selected from the group consisting of an EL panel, EL wire, EL twisted tube, and organic EL, or organic LED (hereafter as OLED).

3. The outlet adapter with EL elements as claimed in claim 2, wherein the at least one EL element has a configuration, size, dimension, specification, shape, curvature, and diameter to enable the EL element to be arranged on a body of the outlet adaptor on a surface, between layers, underneath the body, within the body, injected inside, or behind an opening, cut-outs, or windows to allow people to see light beams emitted by the EL element.

4. The outlet adapter with EL elements as claimed in claim 1, wherein the prong means are connected to the receptacle members and EL element by outlet adaptor inner metal means to supply electricity from the prong means to the EL element and receptacle member.

5. The outlet adapter with EL elements as claimed in claim 1, wherein the additional function is selected from the group consisting of sensor device, motion sensor, light sensor, remote control, PIR device, transmit and receiving device, infrared device, bluetooth device, remote charging device, remote current delivery device, lighting device, voltage detector device, current detector device, air freshener, insect repellant, timer, count down device, and setting device functions.

6. The outlet adapter with EL elements as claimed in claim 1, further including inner metal means that integrate the prong means, receptacle means, and ground means.

7. The outlet adapter with EL elements as claimed in claim 1, wherein the prong means are connected to the receptacle member and EL element by metal means secured by soldering, riveting, taping, snapping, press fitting, clamping, adhesive, chemical compound, or glue.

8. The outlet adapter with EL elements as claimed in claim 1, further comprising conductive means for connecting the prong means and receptacle means and selected from the group consisting of resilient conductive means, conductive means, wires, a metal piece, and a metal spring.

9. The outlet adapter with EL elements as claimed in claim 1, further comprising control means selected from the group consisting of a light sensor, voltage sensor, current sensor, motion sensor, overload sensor, power failure device, infrared device, remote charging device, remote current delivery device, bluetooth device, remote control device, electric signals transmitting and receiving device, switch device, constant power supply system, surge protector device, resetting device, and integrated circuit controlling device.

10. The outlet adapter with EL elements as claimed in claim 1, wherein the EL element is installed on a body of the outlet adapter, within the body, under the body, or fitted into a window or cut-out.

11. The outlet adapter with EL elements as claimed in claim 1, wherein the EL element is provided with a stencil, silkscreen, design, indicia, or printing on the surface of the element.

12. The outlet adapter with EL elements as claimed in claim 1, wherein the prong means of the outlet adaptor includes at least one set having a polarized wide prong member and a narrow prong member.

13. The outlet adapter with EL elements as claimed in claim 12, further comprising ground prong means.

14. The outlet adapter with EL elements as claimed in claim 1, wherein the receptacle means includes a wider receptacle member and a narrow receptacle member.

15. The outlet adapter with EL elements as claimed in claim 14, wherein the receptacle means further includes a ground receptacle member.

16. The outlet adapter with EL elements as claimed in claim 1, wherein a number of said receptacle means is greater than one.

17. The outlet adapter with EL elements as claimed in claim 1, wherein the outlet adaptor has at least one screw hole to allow fastening of a screw to an existing outlet hole.

18. The outlet adapter with EL elements as claimed in claim 1, wherein a body of said outlet adaptor body has a body extension part to allow use of a screw to fasten the outlet adaptor to an existing outlet.

* * * * *